April 3, 1934.   N. WRIGHT   1,953,698
BOTTLE WASHER
Filed Oct. 17, 1929

Inventor
Neal Wright
By
Attorneys

Patented Apr. 3, 1934

1,953,698

UNITED STATES PATENT OFFICE 1,953,698

BOTTLE WASHER

Neal Wright, Eau Claire, Wis., assignor of one-half to William Wright, Green Bay, Wis.

Application October 17, 1929, Serial No. 400,436

1 Claim. (Cl. 141—7)

This invention relates to improvements in bottle washers, and more particularly to a device for cleansing the exterior of filled bottles before being crated for transportation.

In milk bottling plants, it is the usual procedure to fill the bottles and then convey them on a movable conveyor beneath a capping machine where the usual pasteboard stopper is fitted into the neck of the bottle, and the bottle then conveyed to a platform where they are removed into the crates.

As a general rule, during the capping operation, some of the milk will be forced out and run down the side of the bottle and this is usually washed off by a hose or similar means after the bottles have been placed in the crates. This method of washing the bottles is somewhat inconvenient due to the fact that a great deal of the water will ofttimes remain in the crates.

One of the objects of the present invention is the provision of a device for cleansing the bottles directly after the cap has been placed in the neck of a bottle, so that when the bottles reach the end of the conveyor and are placed within the crate or container, the bottles will be thoroughly cleansed and will leave the crate clean and dry for handling.

Another object of the invention is the provision of a bottle washing device wherein the bottles are cleansed directly after capping and the washing water, as well as the milk washed from the bottles, is drained off through a suitable receptacle so as not to interfere with the conveyance of the bottles to the removal end of the conveyor.

With the above and other objects in view, the invention consists in the novel features of construction, the combination and arrangement of parts hereinafter more fully set forth, pointed out in the claim and shown in the accompanying drawing wherein:

Figure 1:
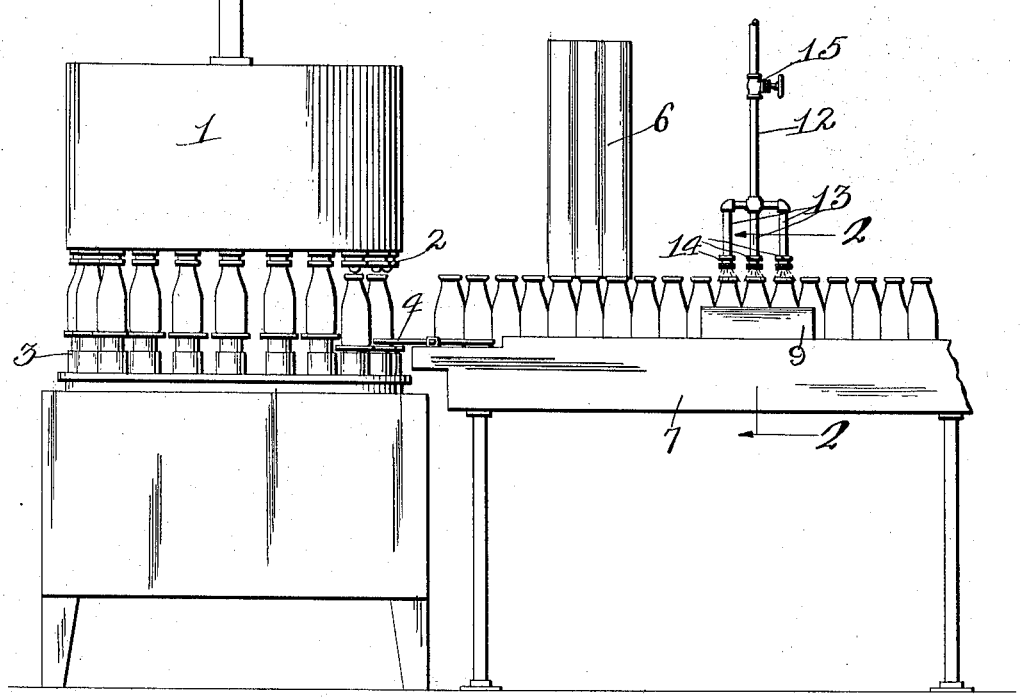
Figure 1 is a side elevation of a portion of a milk bottle filling machine, illustrating the application of my improved washer.
Figure 2:
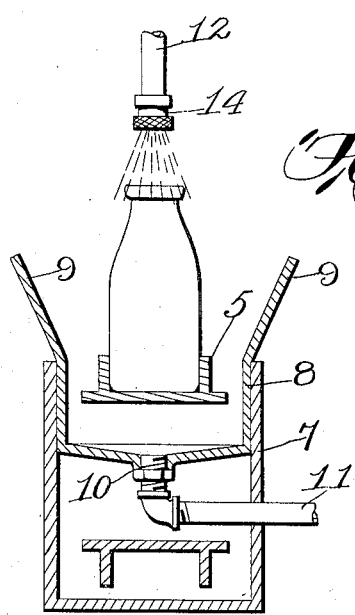
Figure 2 is a sectional view on the line 2—2 of Figure 1.

Referring more particularly to the drawing, it will be noted that I have illustrated my improved washing device in connection with a bottle filling machine, the filling machine, as illustrated, including the usual liquid containing tank 1, having discharge nipples 2 which are projected into the neck of the bottle for filling the same as the bottles are conveyed into position through the conveyor 3.

As a general rule, the filled bottles are removed from the filling conveyor by means of a star wheel 4 on to a movable conveyor 5 which conveys the bottles beneath the capping tubes 6. The bottles when passing beneath the capping tube 6 have forced into the top thereof the usual pasteboard stopper so as to close the neck of the bottle. In placing these stoppers in position, it will be apparent that if a bottle is filled clear to the top, the milk above the retaining bead for the cap will be forced over the sides of the bottle and if the bottle is not washed, it will present a very unclean appearance when delivered to the customer, and it is, therefore, one of the objects of my invention to thoroughly cleanse the bottles before they are removed from the conveyor to be placed in the crates or containers.

At a point within the conveyor trough 7 adjacent the filling tube 6, I provide a trough 8 having upwardly extending divergent side walls 9 and having its bottom inclined inwardly toward a central point where it is provided with a drain opening in which a sleeve 10 is arranged, said sleeve being connected to a suitable drain pipe 11.

Arranged directly above the conveyor 5 is a water inlet pipe 12 and at the lower end of this inlet pipe I provide a plurality of branch pipes 13 having spray nozzles 14 at their lower ends.

These spray nozzles 14 are arranged directly above the central portion of the conveyor 5 so that when the bottles on the conveyor pass beneath the spray nozzles 14, the cleansing fluid discharged from the nozzles will envelop the entire bottle.

While in a great many cases, it will be found that only one spray nozzle is necessary, it is preferred to have more than one, particularly where the conveyor is moving at a comparatively fast speed so that all of the bottles will be thoroughly cleansed before they pass the spray nozzles. It will be noted that by providing the divergent flanges or upstanding walls 9, the cleansing fluid from the spray nozzles 14 will be directed into the trough 8 and conveyed out through the waste pipe 11. Within the pipe 12, I provide a cutoff valve 15 whereby the supply of cleansing fluid to the nozzles 14 may be cut off at any desired time.

It will be apparent from the foregoing description taken in connection with the accompanying drawing, that I have provided a simple but extremely useful device for the purpose which will eliminate the necessity of cleansing the bottles after they have been placed in the crates or containers.

When the filling machine is in operation, the valve 15 may be opened so that the cleansing fluid can be discharged through the nozzles 14, whereby when the bottles pass beneath these spray nozzles, the superfluous milk discharged to the exterior of the bottle by the capping device will be washed from the bottles so that when the bottles reach the end of the conveyor to be placed in the container or crate, they will be in a thoroughly cleansed condition and eliminate the necessity of washing the bottles in the crates.

While I have shown and described the preferred embodiment of my invention, it will be apparent that slight changes may be made in the construction when putting the invention into practice without departing from the spirit of the same or the scope of the appended claim.

I claim:

In a device for washing bottles, a longitudinally disposed, deep bottle receiving trough, a bottle conveyor having upper and lower runs disposed in the trough, the upper run of the conveyor receiving the bottles, means for spraying the upper ends of the bottles on the conveyor, and a liquid receiving trough arranged within the bottle trough and including a bottom wall disposed between the upper and lower runs of the conveyor, whereby the bottom run is protected from the washing liquid, the side walls of the liquid receiving trough being disposed on the opposite sides of the upper run of the conveyor and having oppositely disposed flared extension wings arranged above the upper run of the conveyor and extending beyond the sides of the bottle trough whereby the washing liquid will be directed into the liquid receiving trough, the wings engaging the upper edges of the bottle trough at their point of connection with the side walls of the liquid receiving trough.

NEAL WRIGHT.